United States Patent [19]

Slater, Jr. et al.

[11] 4,051,360

[45] Sept. 27, 1977

[54] LAMP AND MOUNTING STRUCTURE THEREFOR

[75] Inventors: Charles A. Slater, Jr., Overland Park, Kans.; Spencer Darby, Kansas City, Mo.

[73] Assignee: Peterson Manufacturing Company, Grandview, Mo.

[21] Appl. No.: 667,512

[22] Filed: Mar. 17, 1976

[51] Int. Cl.[2] .......... B60Q 1/00; B60Q 3/00; B60Q 11/00

[52] U.S. Cl. .......... 362/363; 339/97 L

[58] Field of Search .......... 240/7.1 R, 7.1 F, 7.1 G, 240/8.2, 8.22, 8.3, 57; 340/87, 89, 115; 307/9; 315/77; 339/97 L, 21 R

[56] References Cited

U.S. PATENT DOCUMENTS

| | | | |
|---|---|---|---|
| 3,321,731 | 5/1967 | Goldbaum | 240/8.2 X |
| 3,400,262 | 9/1968 | Newman et al. | 240/8.2 |
| 3,783,265 | 1/1974 | Carr | 240/7.1 R |

*Primary Examiner*—Richard A. Wintercorn

*Attorney, Agent, or Firm*—Fishburn, Gold & Litman

[57] ABSTRACT

A lamp and mounting structure therefor is particularly adapted for use as a light such as marker and/or clearance lights, turn signals, tail lights, stop lights and the like for trucks, trailers and other such vehicles requiring the use of such lamps and includes a lamp housing and a conductor retaining member having cooperating portions for receiving and positioning an insulated electrical conductor of the vehicle to be pierced by a piercing screw or pin extending through the lamp housing and in electrical contact with a lamp conductor electrically connected to an electric light bulb mounted within the housing. The conductor retaining member is resilient and is received in a complementary recess in the lamp housing and has one end portion thereof secured to the housing and the other end portion is movable away from the housing to receive therebetween the insulated electrical conductor of the vehicle.

6 Claims, 6 Drawing Figures

LAMP AND MOUNTING STRUCTURE THEREFOR

The present invention relates to lights such as marker and/or clearance lights, turn signals, tail lights, stop lights and the like for vehicles or implements and more particularly to a lamp and mounting structure therefor having a conductor mounting member and a lamp housing with cooperating portions for receiving and accurately positioning an electrical conductor of the vehicle to be pierced by a screw or pin for electrically connecting the conductor to an electric light bulb mounted within the lamp housing.

Many attempts have been made to provide an efficient light and mounting on vehicles such as trucks, trailers and the like all requiring special mounting channels on the vehicle and expensive structure to permit mounting of the light on the vehicle.

The principal objects of the present invention are: to provide a lamp and mounting structure therefor particularly adapted for use as a marker and/or clearance light, turn signal, tail lights, stop lights and the like for vehicles or implements; to provide such a lamp having improved means for receiving and retaining an insulated electrical wire or conductor of a vehicle and for positioning same for proper piercing by a piercing member, such as a screw or pin to thereby complete an electric circuit to an electric light bulb within a lamp housing; to provide such a lamp and mounting structure therefor wherein the conductor retaining member is formed of a resilient material and is adapted to be moved away from the lamp housing to receive therein the insulated conductor of a vehicle; to provide such a structure wherein an insulated electrical conductor of a vehicle is received in respective elongated facing recesses or grooves in an exterior surface of the lamp housing and a surface of the conductor retaining member thereby surrounding the conductor; to provide such a structure which is capable of being mounted at any desired location on the vehicle; and to provide such a lamp and mounting therefor which is economical to manufacture, durable in construction, positive in operation, attractive in appearance, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the lamp and mounting structure therefor.

Figure 1:
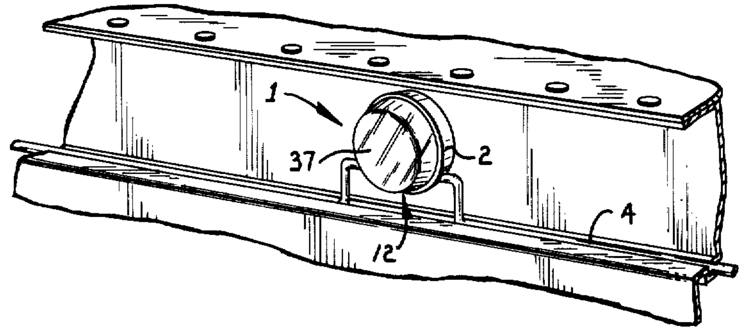
FIG. 1 is a perspective view of a lamp embodying features of the present invention and shown mounted on a structure having a source of electrical power.
Figure 2:
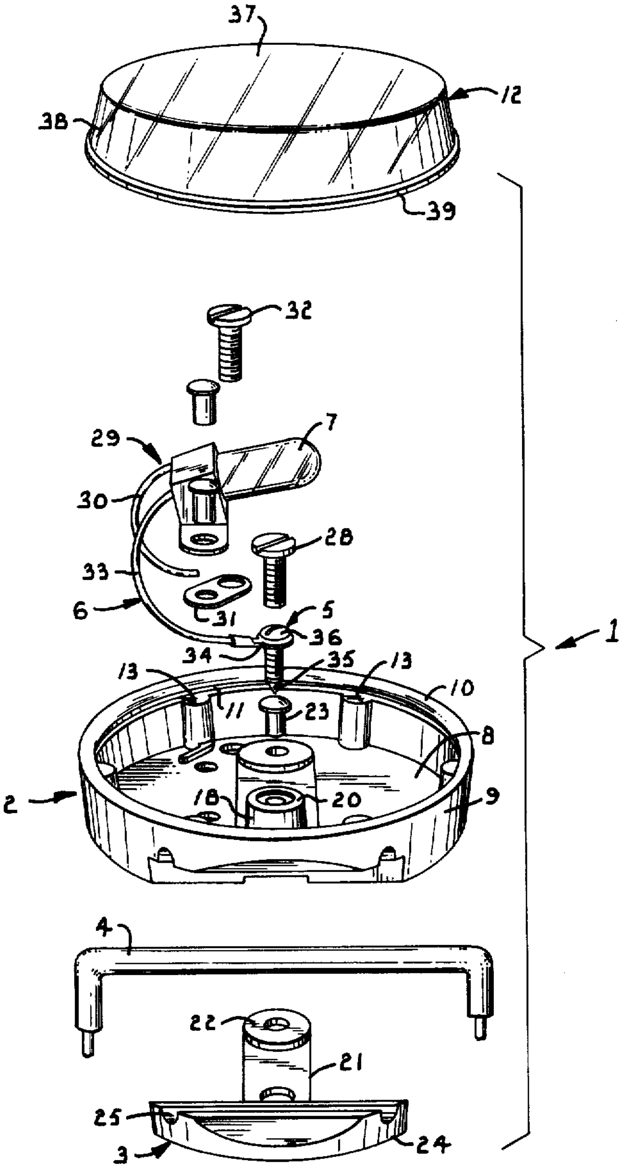
FIG. 2 is an enlarged exploded perspective view of a lamp and mounting structure therefor.
Figure 3:
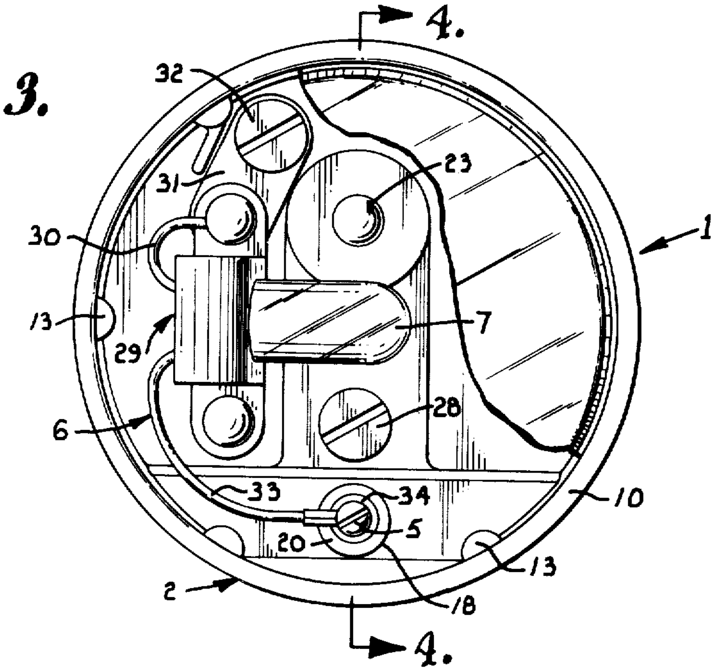
FIG. 3 is a further enlarged top plan view of a lamp with portions of a lens thereon broken away to illustrate component parts of the lamp.
Figure 4:
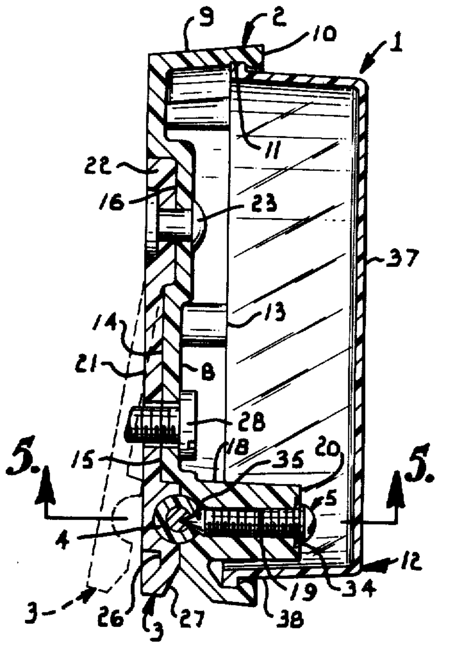
FIG. 4 is a further enlarged transverse sectional view taken on line 4—4 of FIG. 3 and showing in broken lines an alternate position of a conductor mounting member.
Figure 5:
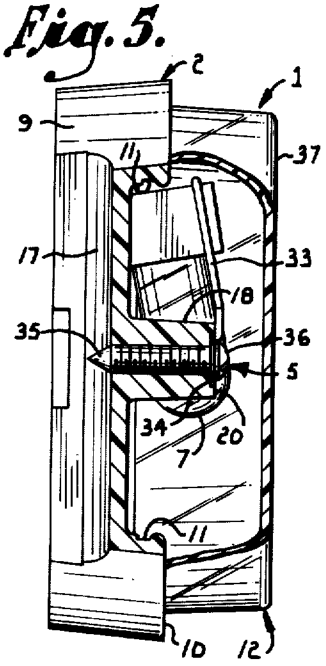
FIG. 5 is a further enlarged sectional view taken on line 5—5 of FIG. 4 and shown with a conductor mounting member removed for clarity.
Figure 6:
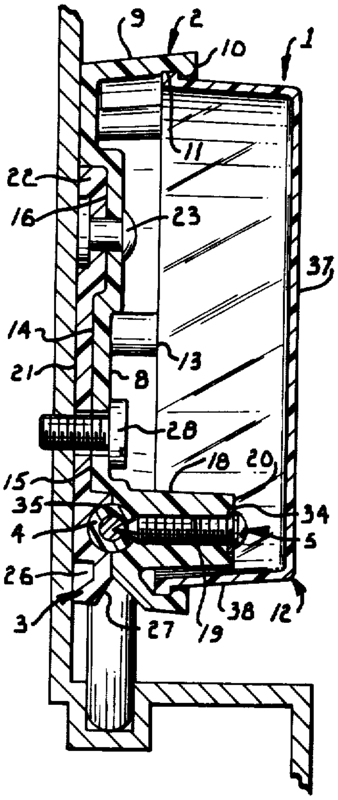
FIG. 6 is a further enlarged transverse sectional view similar to FIG. 4 except showing the lamp mounted on a body of a vehicle.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a lamp and mounting structure therefor which is particularly adapted for use as a light, such as a marker and/or clearance light, turn signals, tail lights, stop lights and the like for trucks, trailers and other vehicles requiring such lamps. The lamp and mounting structure therefor includes a lamp housing 2 and a conductor retaining member 3 having cooperating portions for receiving and positioning an electrical cable 4 having a conductive core to be pierced by a piercing member such as a screw or pin 5 in electrical contact with a lamp conductor 6 electrically connected to an electric light bulb 7 mounted within the housing 2. The conductor retaining member 3 is made of resilient non-conductive material and is received in a complementary recess in the lamp housing 2 and has one end portion thereof secured to the housing 2 and the other end portion is movable away from the housing 2 to receive therebetween the insulated electrical cable 4 having the conductive core.

The lamp housing 2 provides a compartment to have the electric light bulb 7 therein. The lamp housing 2 may be any desired shape, however, a generally circular shape is illustrated. The lamp housing 2 is of an electrically non-conductive material and includes a base wall 8 and a side wall 9 extending from the base wall 8 and defining an open top or front compartment.

A free edge 10 of the side wall 9 is enlarged and has a thickened portion on an interior surface thereof. The side wall 9 also has an annular groove recess 11 in the interior surface thereof and the recess 11 is positioned adjacent the thickened or enlarged portion so that side wall 9 is formed to receive and have mounted thereon a lens 12 with a rib or bead engaged in said recess.

The lamp housing 2 illustrated has a plurality of columns or ribs are formed on the interior surface of the side wall 9. The housing 2 is of resilient material and the ribs or columns on the side wall 9 of the housing 2 strengthen same and aid in maintaining the shape of the lamp housing 2.

The conductor retaining member 3 is received in a recess or guide way 14 in an exterior surface of the base wall 8 of the lamp housing 2. The guide recess 14 has a first portion adjacent a periphery of the base wall 8 and defining a shoulder extending across the base wall 8. The guide recess 14 has a second portion extending laterally from the first portion and having one end portion thereof spaced from the first portion.

In the illustrated structure, the guide recess 14 has an elongated entrance portion 15 extending radially inwardly from a periphery of the base wall 8 and normal to a conductor receiving portion of the recess 14. The recess 14 terminates in a generally circular and enlarged or further recessed portion 16. The entrance portion 15 and the further recessed portion 16 of the recess 14 is formed to receive therein a first portion of the conductor mounting member 3, as later described.

The shoulder defined by the first portion of the recess 14 has a channel 17 therein for receiving therein the insulated conductor 4. The channel 17 is illustrated as semi-circular in cross section thereby defining a recess complementary to a portion of the insulated electrical conductor 4. The conductor receiving channel 17 is positioned adjacent the peripheral edge of the base wall 8 and extends across the base wall 8. The conductor receiving channel 17 is formed in the shoulder defined by the first portion of the recess 14 in the base wall 8 which receives therein a second portion of the conductor retaining member 3, as later described.

The lamp housing 2 has means thereon for guiding and positioning the piercing member 5 in electrical contact with the conductive core of the insulated wire or conductor 4 thereby completing an electrical circuit to the bulb 7. In the illustrated structure, the interior surface of the base wall 8 has a guide portion 18 extending therefrom and having a bore 19 therethrough. The guide portion 18 is illustrated as an upstanding member and positioned so that the piercing member receiving bore 19 extends from a free end 20 of the guide portion 18 and intersects the conductor receiving channel 17 at the center line of the entrance portion 15 of the recess 14.

The recess 14 in the base wall 14 of the lamp housing 2 is generally T-shaped, therefore, the conductor retaining member 3 is also a generally T-shaped member and has a first portion 21 with a shape complementary to the shape of the entrance portion 15 and to the enlarged portion 16 of the second portion of the recess 14 in the base wall 8 of the lamp housing 2. The first portion 21 of the conductor retaining member 3 has one end portion 22 thereof enlarged to be received in the enlarged portion 16 of the second portion of the recess 14 in the base wall 8. The one end portion 22 of the conductor retaining member 3 is suitably connected to the base wall 8, as by a rivet 23.

The conductor retaining member 3 has a second portion 24 extending substantially perpendicular or normal to and in opposite directions from the first portion 21 and from the other end portion thereof. The second portion 24 of the conductor retaining member 3 has an elongated channel 25 therein for receiving therein a portion of the insulated conductor 4. The channel 25 is illustrated as semi-circular in cross section and is positioned in facing relation with the conductor receiving channel 17 in the shoulder defined by the first portion of the recess 14 in the base wall 8. The shape of the elongated channel 25 is thereby complementary to a portion of the insulated electrical conductor 4. The second portion 24 is enlarged and has a shape complementary to the enlarged or further recessed portion of the base wall 8. The conductor receiving channel 17 in the base wall 8 and the elongated channel 25 in the second portion 24 of the retaining member 3 surround and enclose the insulated electrical conductor 4 with the electrical conductor 4 substantially completely filling the space defined by the channels 17 and 25.

The outwardly facing surface of the second portion 24 of the conductor retaining member 3 has a recess 26 therein and the outer peripheral edge 27 of the second portion 24 is tapered toward the outwardly facing surface thereby defining a gripping portion for moving the conductor retaining member 3 away from the base wall 8 of the lamp housing 2 thereby permitting the insulated conductor 4 to be moved into the facing channels 17 and 25.

The conductor retaining member 3 is formed of a resilient electrical non-conductive material whereby the second portion 24 thereof may be moved away from the base wall 8 of the lamp housing 2 so that a portion of the insulation sheath of the electrical cable 4 of a cargo trailer or other towed vehicle or implement may be moved between the base wall 8 and the second portion 24 of the conductor mounting member 3.

After the insulated cable or conductor 4 is in position in the channels 17 and 25, it is desirable to secure the conductor retaining member 3 in engagement with the base wall 8 of the lamp housing 2. Therefore, a suitable fastening device, such as a screw 28 extends through the first portion 21 of the conductor mounting member 3 and the base wall 8 of the lamp housing 2 and into the grounding metal frame or body of the cargo trailer. The screw 28 is positioned adjacent the guide portion 18 and spaced from the rivet 23. The screw 28 and the rivet 23 thereby secure the first portion 21 of the conductor retaining member 3 to the base wall 8 of the lamp housing 2.

The lamp 1 includes suitable bulb holding means 29 mounted in the compartment within the lamp housing 2 for receiving and holding the electric light bulb 7. The bulb holding means 29 include a socket having the lamp conductor 6 electrically connected thereto. The lamp conductor 6 has a first electrical conductor portion 30 suitably grounded, as by being electrically connected to a suitable metal ground strap or bar 31. In the illustrated embodiment, one end of the metal ground strap 31 is suitably mounted on an interior surface of the base wall 8 of the lamp housing 2, as by a rivet, and the other end portion of the ground strap 31 is electrically connected to the metal frame or body of the vehicle, as by a metal screw 32. The screws 28 and 32 are both connected to the metal frame or body of the vehicle, such as a structural channel mounted on an exterior surface of the respective vehicle or implement body.

The lamp conductor 6 of the bulb holding means 29 includes a second electric conductor portion 33 having a terminal 34 on one end thereof. The terminal 34 is illustrated as a metal ring or annular member in engagement with the free end 20 of the guide portion 18. The terminal 34 has an opening therethrough aligned with the bore 19 in the guide portion 18.

The lamp 1 includes means mounted on the lamp housing 2 and in electrical contact with the terminal 34 of the second electrical conductor portion 33 of the bulb holding means 29 and with the electrical conductor 4 electrically connected to a source of electrical power, such as the electrical system of a prime mover or tractor (not shown). In the illustrated embodiment, the piercing member 5 is formed of an electrically conductive metal and extends through the opening in the terminal 34 and through the bore 19 in the guide portion 18. The piercing member 5 has a pointed end portion 35 movable to penetrate the insulation sheath of the electrical cable and into electrical contact with the conductive core thereof. The piercing member 5 has a head portion 36 in engagement with the metal terminal 34 and the piercing member 5 is of a length such that the pointed end portion 35 thereof pierces the insulation of the electrical conductor 4 and is in electrical contact with the conductive core of the insulated conductor 4 but does not engage the surface defining the conductor receiving channel 25 in the second portion 24 of the conductor retaining member 3.

When the lens 12 is mounted on the frame edge 10 of the lamp housing 2, the light bulb 7 is enclosed within the compartment of the lamp housing 2. The lens 12 is illustrated as a cap-like member having an end wall 37 and a side wall 38 extending therefrom with a free edge portion 39 enlarged to define a rim having a shape to engage the seat means 13 and be received in the recess 11 in the interior surface of the side wall 9 of the lamp housing 2.

In using a lamp and mounting structure therefor constructed as illustrated and described, the conductor retaining member 3 has the one end portion 22 of the first portion 21 connected to the base wall 8 by the rivet 23. The lamp housing 2 is positioned adjacent the insulated electrical conductor 4 of the respective vehicle or implement and the peripheral edge portion 27 of the second portion 24 of the conductor retaining member 3 is moved away from the base wall 8 of the lamp housing 2. The insulated electrical conductor 4 is moved between the lamp housing 2 and the conductor retaining member 3 and received within the channels 17 and 25. The screw 28 is then placed in position to hold the conductor retaining member 3 in engagement with the lamp housing 2. The screw 28 is further tightened to extend into the structure or body of the vehicle thereby partially mounting the housing 2 and conductor retaining member 3 on the vehicle. The terminal 34 of the second electrical conductor portion 33 of the lamp conductor 6 is positioned in engagement with the free end 20 of the guide portion 18 and the piercing member 5 is mounted in the guide portion 18. Tightening the piercing member 5 moves the head portion 36 thereof into engagement with the terminal 34 and the pointed end portion 35 into electrical contact or engagement with the conductive core of the insulated conductor 4. The screw 32 is then positioned and tightened to secure the ground strap or bar 31 in the lamp housing 2 and the screw 32 also cooperates with the screw 28 for holding the lamp housing 2 on the metal frame or body of the respective vehicle or trailer.

It is to be understood that while We have illustrated and described one form of our invention, it is not to be limited to the specific form or arrangement of parts herein described and shown.

What We claim and desire to secure by Letters Patent is:

1. A lamp assembly comprising:

a. a housing having a base wall of electrically non-conductive material and a side wall extending therefrom to define an open top compartment, said base wall having an exterior surface and a first recessed portion therein extending across said base wall, said base wall having an elongated channel in said first recessed portion for receiving therein an insulated conductor, said base wall having a second recessed portion extending laterally from said first recessed portion and having one end portion thereof spaced from said first recess;

b. a conductor retaining member having a first portion and a second portion received in said first and second recessed portions respectively of said housing base wall, said second portion having an end portion thereof secured to said base wall in spaced relation to said first portion, said first portion having an elongated channel therein in facing mating relation with said channel in said first recessed portion of said base wall to receive the insulated conductor in said channels, said conductor retaining member being of resilient electrically non-conductive material to normally retain the insulated conductor in the channels and permit said first portion of the retaining member to be moved away from said base wall of said housing to expose said channels for movement of the insulated conductor to and from said channels;

c. an electrical light bulb and means in the compartment of said housing for receiving same and including an electrical conductor connected to an electrical ground and having a terminal on one end thereof;

d. means mounted on said housing and in electrical contact with the terminal of said electrical conductor of said bulb receiving means and with the insulated conductor for completing an electrical circuit to said bulb; and e. a lens mounted on said housing and closing the compartment with said bulb therein.

2. A lamp assembly as set forth in Claim 1 wherein:

a. said base wall of said housing has an interior surface;

b. said base wall has a bore extending from said interior surface and intersecting said channel in said first recessed portion of said base wall; and c. said means for completing an electrical circuit to said bulb includes a piercing member mounted in the bore and having a point on one end portion thereof capable of being moved into electrical contact with the insulated conductor.

3. A lamp assembly as set forth in Claim 1 wherein:

a. said second recessed portion in said housing base wall has a deeper end portion to define a pocket in said base wall; and b. the end portion of said second portion of said conductor retaining member is thicker and has a complementary shape to said deeper end portion of said second recessed portion to be received and retained therein.

4. A lamp assembly as set forth in claim 1 wherein:

a. said conductor retaining member has an exterior surface substantially flush with the exterior surface of said housing base wall; and b. means engage said housing and said conductor retaining member for mounting same on a structure having the insulated conductor thereon and retain the conductor retaining member in said recessed portions and engaging said conductor.

5. A lamp assembly comprising:

a. a housing formed of resilient material and having a base wall and a side wall extending therefrom to define an open top compartment, said base wall having an exterior surface and a first recessed portion extending across said base wall, said first recessed portion having an elongated channel therein for receiving therein an insulated conductor, said base wall having a second recessed portion extending laterally from said first recess and having one end portion thereof spaced from said first recessed portion;

b. a conductor retaining member of resilient electrically non-conductive material and having a first portion and a second portion, said first portion being received in said first recessed portion and said second portion being received in said second recessed portion in said housing base wall, said second portion having one end portion thereof secured to said base wall adjacent the one end portion of said second recessed portion, said first portion having an elongated channel therein and positioned in facing mating relation with said channel in said shoulder on said base wall to receive and normally retain therein the insulated conductor, said first portion of said conductor retaining member being movable away from said base wall of said housing to expose said channels for movement of a conductor to and from said channels;

c. an electrical light bulb and means in the compartment of said housing for receiving same and including an electrical conductor having a terminal on one end thereof;

d. a guide portion extending from an interior surface of said base wall of said housing and having a bore therethrough, said bore intersecting said channel in said first recessed portion of said base wall;

e. a piercing member mounted in the bore through said guide portion and having a point on one end portion thereof capable of being moved into electrical contact with the insulated conductor, said piercing member having the other end portion thereof in electrical contact with said terminal of said electrical conductor of said bulb receiving means for completing an electrical connection to said bulb;

f. a lens removably mounted on said side wall of said housing and closing the compartment with said bulb therein; and g. means engaging said housing and said conductor retaining member for mounting same on a structure having the insulating conductor and retain said conductor retaining member engaged with a conductor in said channels.

6. A lamp assembly as set forth in claim 5 wherein:

a. the one end portion of said second recess in said housing base wall is enlarged to define a pocket in said base wall; and b. the one end portion of said second portion of said conductor retaining member is enlarged and has a complementary shape to said one end portion of said second recess to be received and retained therein.

* * * * *